US012524780B2

(12) United States Patent
Sim et al.

(10) Patent No.: US 12,524,780 B2
(45) Date of Patent: Jan. 13, 2026

(54) INTERACTIVE DIGITAL ADVERTISING WITHIN VIRTUAL EXPERIENCES

(71) Applicant: Roblox Corporation, San Mateo, CA (US)

(72) Inventors: Richard Sim, San Mateo, CA (US); Dmitri V. Parks, Denver, CO (US); Sari Abukhadra, Foster City, CA (US); Thiago Moraes, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 6 days.

(21) Appl. No.: 18/243,839

(22) Filed: Sep. 8, 2023

(65) Prior Publication Data

US 2024/0086964 A1   Mar. 14, 2024

Related U.S. Application Data

(60) Provisional application No. 63/454,823, filed on Mar. 27, 2023, provisional application No. 63/404,827, filed on Sep. 8, 2022.

(51) Int. Cl.
| | |
|---|---|
| G06Q 30/00 | (2023.01) |
| G06Q 30/0251 | (2023.01) |
| G06T 13/40 | (2011.01) |
| G06T 17/00 | (2006.01) |
| G06V 40/20 | (2022.01) |

(52) U.S. Cl.
CPC ......... *G06Q 30/0251* (2013.01); *G06T 13/40* (2013.01); *G06T 17/00* (2013.01); *G06V 40/20* (2022.01)

(58) Field of Classification Search
None
See application file for complete search history.

(56) References Cited

U.S. PATENT DOCUMENTS

| 10,229,421 B2 * | 3/2019 | Baszucki | G06Q 30/02 |
| 2004/0015608 A1 * | 1/2004 | Ellis | A63F 13/12 |
| | | | 709/246 |

(Continued)

FOREIGN PATENT DOCUMENTS

WO   2008/106196   9/2008

OTHER PUBLICATIONS https://medium.com/@junyingw/future-of-gaming-rasterization-vs-ray-tracing-vs-path-tracing-32b334510f1f , 2019 , Junying Wang.*

(Continued)

*Primary Examiner* — Christopher Stroud
(74) *Attorney, Agent, or Firm* — IP Spring

(57) ABSTRACT

Some implementations relate to methods, systems, and computer-readable media for digital advertising within a virtual experience provided at a virtual experience platform. A user's avatar's viewpoint, perspective, time spent viewing, and other attributes are accurately tracked to determine an overall advertising impression. Different advertisements may be displayed to an avatar based on the avatar approaching a digital advertisement element and being within a threshold distance of the digital advertising element. Furthermore, metrics based upon user engagement may be tracked and associated with displayed advertisements.

16 Claims, 6 Drawing Sheets

(56) References Cited

U.S. PATENT DOCUMENTS

| | | | |
|---|---|---|---|
| 2006/0155597 A1* | 7/2006 | Gleason | G06Q 30/02 |
| | | | 705/14.27 |
| 2006/0256133 A1 | 11/2006 | Rosenberg | |
| 2008/0263458 A1* | 10/2008 | Altberg | H04N 7/157 |
| | | | 370/352 |
| 2009/0063983 A1 | 3/2009 | Amidon et al. | |
| 2009/0076894 A1* | 3/2009 | Bates | G06Q 30/0264 |
| | | | 705/14.61 |
| 2010/0131355 A1* | 5/2010 | Kitchen | A63F 13/30 |
| | | | 705/14.43 |
| 2010/0205035 A1* | 8/2010 | Baszucki | G06Q 20/102 |
| | | | 705/40 |
| 2013/0311268 A1* | 11/2013 | Huang | G06Q 30/0275 |
| | | | 705/14.41 |
| 2013/0311308 A1* | 11/2013 | Huang | G06Q 30/0275 |
| | | | 705/14.73 |
| 2014/0324576 A1* | 10/2014 | van Datta | A63F 13/50 |
| | | | 705/14.49 |
| 2017/0024682 A1* | 1/2017 | Piccionelli | G06Q 10/063114 |
| 2017/0193566 A1* | 7/2017 | Lucash | G06Q 30/0277 |
| 2017/0323306 A1 | 11/2017 | Kusumoto et al. | |
| 2019/0001221 A1* | 1/2019 | Park | A63F 13/86 |
| 2021/0279962 A1 | 9/2021 | Hutten et al. | |
| 2022/0066537 A1* | 3/2022 | Govindgari | G06Q 30/08 |
| 2024/0185287 A1* | 6/2024 | Nimale | G06Q 30/0242 |

OTHER PUBLICATIONS

USPTO, International Search Report for International Patent Application No. PCT/US2023/032266, Jan. 8, 2024, 2 pages.

USPTO, Written Submission for International Patent Application No. PCT/US2023/032266, Jan. 8, 2024, 8 pages.

* cited by examiner

INTERACTIVE DIGITAL ADVERTISING WITHIN VIRTUAL EXPERIENCES

CROSS-REFERENCE TO RELATED APPLICATIONS

This application claims the benefit of priority to U.S. Provisional Application Ser. No. 63/404,827, filed on Sep. 8, 2022, entitled "INTERACTIVE DIGITAL ADVERTISING WITHIN VIRTUAL EXPERIENCES," and to U.S. Provisional Application Ser. No. 63/454,823, filed on Mar. 27, 2023, entitled "INTERACTIVE DIGITAL ADVERTISING WITHIN VIRTUAL EXPERIENCES," in which the entire contents of both applications are hereby incorporated by reference herein.

TECHNICAL FIELD

Embodiments relate generally to online virtual experience platforms, and more particularly, to methods, systems, and computer readable media for interactive digital advertising within virtual experiences.

BACKGROUND

Online platforms, such as virtual experience platforms and online gaming platforms, can sometimes include digital advertisements, including advertisements for virtual items users can purchase. However, it can be difficult to determine a level of engagement or distraction of users based on the advertisements. For example, some users may always purchase a virtual item for use in a pre-determined gaming scenario or goal and engagement metrics may therefore be difficult to ascertain. Other users may actively ignore advertisements and still purchase virtual items. Furthermore, there may be other users that engage with advertisements but do not actively purchase for one reason or another. Moreover, some users may be served advertisements simultaneously and within proximity of one another, making it difficult to determine a level of engagement for each user viewing the advertisement substantially at the same time.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to provide interactive digital advertisements in virtual experiences.

In one aspect, a computer-implemented method is disclosed, comprising: receiving a digital advertisement configured for viewing by a target demographic; detecting an avatar within a threshold distance of a digital advertisement element presented in the virtual experience, the avatar being associated with a user, wherein the user is associated with the target demographic; presenting the received digital advertisement at the digital advertisement element for viewing by the avatar; tracking the avatar's engagement with the digital advertisement, wherein the avatar's engagement is a measure of the avatar's interaction with the digital advertisement; and assigning a user engagement metric to the presented digital advertisement based upon the tracking of the avatar's engagement.

Various implementations of the computer-implemented method are described.

In some implementations, the digital advertisement comprises digital video, and wherein tracking the avatar's engagement comprises tracking active viewing of the digital video.

In some implementations, the threshold distance of the digital advertisement element is a configurable distance based upon a total number of pixels of the digital advertisement.

In some implementations, the digital advertisement element is one or more of: a virtual billboard, a virtual display device, a virtual wall, or a virtual element having at least one surface.

In some implementations, detecting the avatar within the threshold distance comprises determining that the avatar is within the threshold distance associated with the digital advertisement.

In some implementations, presenting the digital advertisement comprises: initiating playback of a digital video associated with the digital advertisement for viewing by the avatar.

In some implementations, tracking the avatar's engagement comprises tracking head movements and viewports associated with the avatar to determine whether a respective digital advertisement is being viewed.

In some implementations, the avatar's engagement is based upon one or more of viewpoint, perspective, time spent viewing, size of view, obfuscation of view, or distance.

In some implementations, the method further comprises ceasing presenting the digital advertisement in response to the avatar turning away from the digital advertisement element.

In some implementations, tracking the avatar's engagement comprises determining a percentage of pixels associated with the digital advertisement that are viewable by the avatar.

In another aspect, a non-transitory computer-readable medium is described with instructions stored thereon that, responsive to execution by a processing device, causes the processing device to perform operations comprising: receiving a digital advertisement configured for viewing by a target demographic within a virtual experience; detecting an avatar within a threshold distance of a digital advertisement element presented in the virtual experience, the avatar being associated with a user, wherein the user is associated with the target demographic; presenting the received digital advertisement at the digital advertisement element for viewing by the avatar; tracking the avatar's engagement with the digital advertisement, wherein the avatar's engagement is a measure of the avatar's interaction with the digital advertisement; and assigning a user engagement metric to the presented digital advertisement based upon the tracking of the avatar's engagement.

Various implementations of the non-transitory computer-readable medium are described.

In some implementations, the digital advertisement comprises digital video, and wherein tracking the avatar's engagement comprises tracking active viewing of the digital video.

In some implementations, the threshold distance of the digital advertisement element is a configurable distance based upon a total number of pixels of the digital advertisement.

In some implementations, the digital advertisement element is one or more of: a virtual billboard, a virtual display device, a virtual wall, or a virtual element having at least one surface.

In some implementations, detecting the avatar within the threshold distance comprises determining that the avatar is within the threshold distance associated with the digital advertisement.

In some implementations, wherein presenting the digital advertisement comprises: initiating playback of a digital video associated with the digital advertisement for viewing by the avatar.

In some implementations, tracking the avatar's engagement comprises tracking head movements and viewports associated with the avatar to determine whether a respective digital advertisement is being viewed.

In some implementations, the avatar's engagement is based upon one or more of: viewpoint, perspective, time spent viewing, size of view, obfuscation of view, or distance.

In some implementations, the operations further comprise ceasing presenting the digital advertisement in response to the avatar turning away from the digital advertisement element.

In another aspect, a system is described, comprising: a memory with instructions stored thereon; and a processing device, coupled to the memory and operable to access the memory, wherein the instructions when executed by the processing device, cause the processing device to perform operations including: receiving a digital advertisement configured for viewing by a target demographic within a virtual experience; detecting an avatar within a threshold distance of a digital advertisement element presented in the virtual experience, the avatar being associated with a user, wherein the user is associated with the target demographic; presenting the received digital advertisement at the digital advertisement element for viewing by the avatar; tracking the avatar's engagement with the digital advertisement, wherein the avatar's engagement is a measure of the avatar's interaction with the digital advertisement; and assigning a user engagement metric to the presented digital advertisement based upon the tracking of the avatar's engagement.

Various implementations of the system are described.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
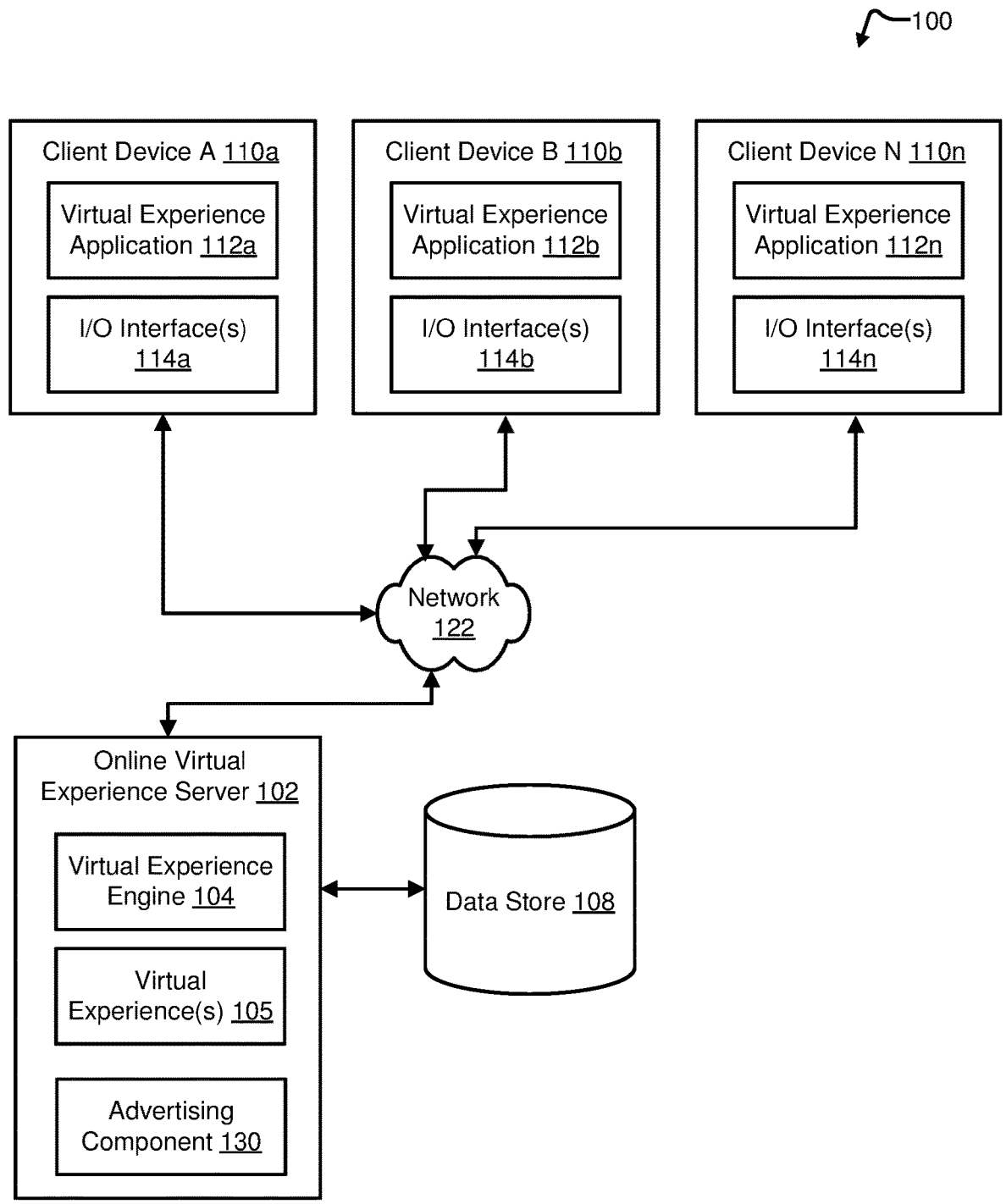
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

In some aspects, systems and methods are provided for interactive digital advertising within a virtual experience. Online platforms, such as online virtual experience platforms, generally provide an ability to create, store, advertise, and present for purchase virtual items to be used in virtual experiences.

For example, virtual experience platforms may include user-generated content or developer-generated content (each referred to as "UGC" herein). The UGC may be stored and implemented through the virtual experience platform, for example, by allowing users to search and interact with various virtual experiences and associated virtual items. Virtual items may be presented in a search interface or inventory screen, whereby users may peruse virtual items, search for new virtual items, and/or purchase virtual items prior to entering a virtual experience.

While search interfaces and inventory screens allow users to search for items, virtual experiences provide an immersive experience for a user. For example, avatars may move about virtual experiences and interact with a plurality of virtual items in a typical virtual experience.

Example embodiments may provide interactive digital advertisements, within a first virtual experience, that can be tracked and audited. Various revenue payments for advertising may be implemented and based upon tracked advertising impressions.

According to implementations and embodiments described herein in detail, an online virtual experience platform may deploy an advertising component at a server, and provide one or more interactive digital advertisements within one or more virtual experiences. The advertising component, based on user-permitted user data, may provide interactive digital advertising of virtual items in an interactive, engaging, and suitable experience depending upon relevant user data. Advertisements may be viewed by multiple avatars simultaneously, with each avatar being provided their own view of the digital advertisement, such that one avatar's view of another's digital advertisement may be obfuscated or hidden. In this manner, many different advertisements may be tracked simultaneously on a per-user basis. Furthermore, multiple avatars may interact with different digital advertisements for which engagement metrics are tracked. These and other suitable example embodiments will become apparent in this disclosure.

It is noted that any use of user and/or developer data to determine users' interests, identify matching items, or any other purpose is specifically with permission from the user, in accordance with applicable regulations, and can be turned off by the user. Users can also choose what data to permit for such use. User data is stored securely and in compliance with rules and laws. Furthermore, data collection is not performed in certain geographic locales, for certain user categories (e.g., based on age or other demographic), is temporary (data are discarded after a period of time), and data is stored securely even when only used temporarily. Moreover, user data are not shared with third-parties without explicit user permission. Even further, some data may be anonymized, aggregated across users, or otherwise modified so that a specific user identity cannot be determined.

Hereinafter, further details surrounding example embodiments and various aspects of this disclosure are described with reference to the figures.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The network environment 100 (also referred to as a "platform" herein) includes an online virtual experience server 102, a data store 108, a client device 110 (or multiple client devices), and a third party server 118, all coupled via a network 122.

The online virtual experience server 102 can include, among other things, a virtual experience engine 104, one or more virtual experiences 105, and an advertising component 130. The online virtual experience server 102 may be configured to provide virtual experiences 105 to one or more client devices 110, and to provide interactive digital advertisements via the advertising component 130, in some implementations.

Data store 108 is shown coupled to online virtual experience server 102 but in some implementations, can also be provided as part of the online virtual experience server 102. The data store may, in some implementations, be configured to store advertising data, user data, engagement data, and/or other contextual data in association with the advertising component 130.

The client devices 110 (e.g., 110a, 110b, 110n) can include a virtual experience application 112 (e.g., 112a, 112b, 112n) and an I/O interface 114 (e.g., 114a, 114b, 114n), to interact with the online virtual experience server 102, and to view, for example, graphical user interfaces (GUI) through a computer monitor or display (not illustrated). In some implementations, the client devices 110 may be configured to execute and display virtual experiences, which may include digital advertising elements as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., user 114 via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience and in association with the advertising component 130, a user's avatar may view an interactive digital advertisement. Using data related to context, prior user interactions, and prior user engagement with various virtual experiences, the digital advertisement may advertise one or more virtual items that may be of interest to the user.

The user's avatar's placement, viewpoint, perspective, and time spent viewing may all be used to track advertising impressions as described herein with the advertising component 130 and/or other components of platform 100.

In some implementations, the advertising component 130 may provide control and provisioning of digital advertisements within virtual experiences served by the online virtual experience platform 100. For example, digital advertisements may be viewed by an avatar, and automatically altered, paused, resumed, etc., depending upon the avatar's interaction with the digital advertisement.

The advertising component 130 may receive indications that particular avatars are within a threshold distance of digital advertising elements and may present advertising (e.g., selected digital advertisement for each user based on one or more characteristics of users associated with the particular avatars) on the elements. The digital advertisement that is presented may be different depending upon which avatar is viewing the advertising element. For example, two different avatars that are viewing the same digital advertising element within the same virtual experience may see the same or different advertising (or other content) on the digital advertising element, depending upon an associated demographic and other considerations. For example, the digital advertisement may be tailored based on various user-permitted data regarding the users associated with each avatar, such as demographic data (e.g., age, location, gender), activity data within the virtual experience, e.g., prior items purchased, items engaged with, avatar configuration, items that the avatar viewed previously, items that other avatars that are linked to the particular avatar (e.g., friends on the virtual experience platform) engaged with, etc., or from other virtual experiences on the virtual experience platform, etc.

Hereinafter, an example flow of interactive digital advertising using digital advertising elements such as billboard, walls, surfaces, items, objects, and others, is described with reference to FIG. 2.

Figure 2:
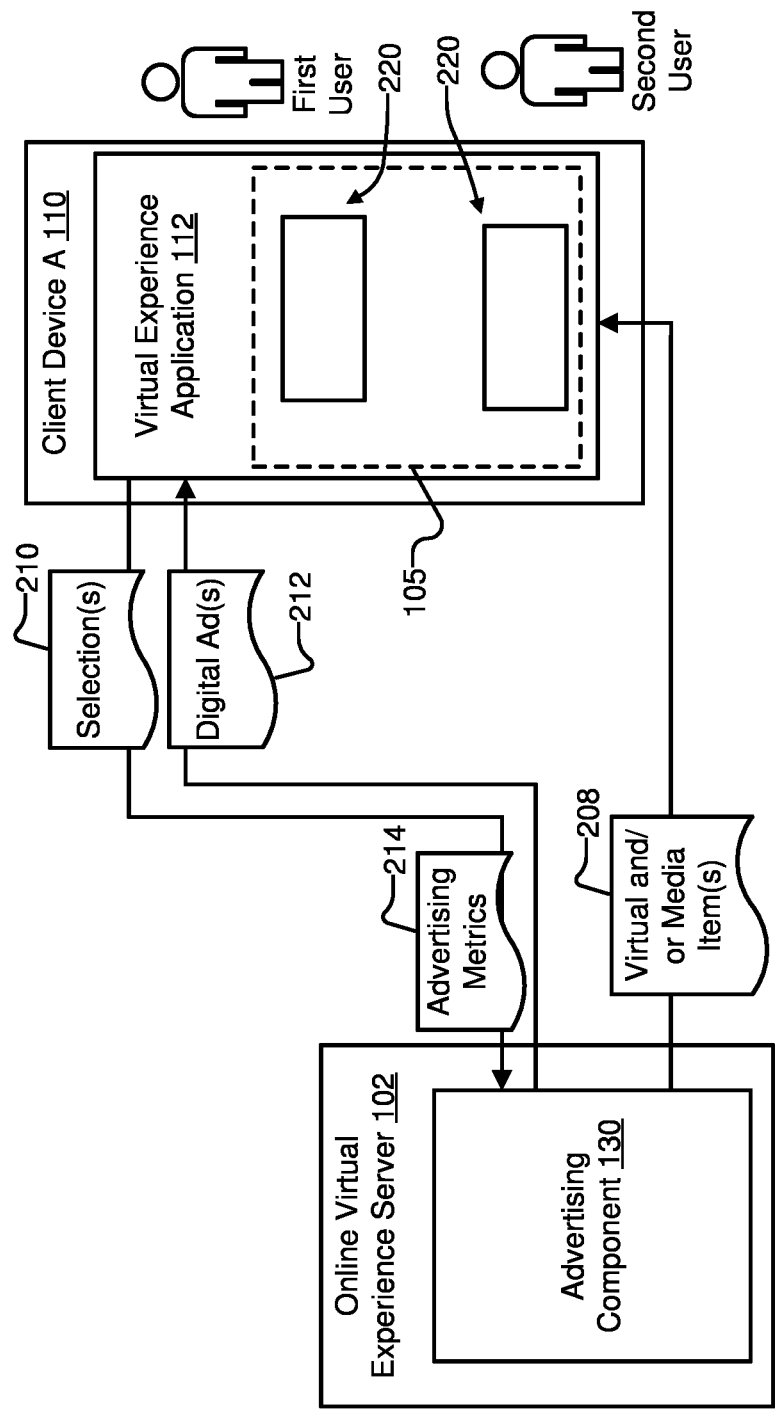
FIG. 2 is a diagram of an example system architecture to implement interactive digital advertisements, in accordance with some implementations.

FIG. 2: Digital Advertising Architecture

FIG. 2 is a diagram of an example system architecture 200 to provide interactive digital advertising, in accordance with some implementations.

The system architecture 200 (also referred to as a "subsystem" herein) includes the online virtual experience server 102, advertising component 130, and client device 110 executing virtual experience application 112. Online virtual experience server 102 and client device 110 may be arranged as described above with reference to FIG. 1, namely, in operative communication over network 122 (omitted here for clarity).

In one example, a party may create one or more digital advertisements 212 for deployment and use in a virtual experience. The digital advertisements 212, as well as any specified settings for advertising, may be input into the advertising component 130. Several specified settings may be used. For example, a creator of the digital advertisements 212 may specify an amount of currency, virtual currency, or payment they would pay for X number of views, an amount of currency they would pay for Y number of try-ons, an amount of currency for Z number of purchases, and/or if the virtual item should be advertised to a particular type of user, subscriber, only premium users, or on another basis.

The advertising component 130 may take as input the digital advertisements 212 and specified settings for advertising, and create an ad profile for the respective party and digital advertisements 212 combination. For example, the party may indicate one or more settings for advertising based upon any suitable advertising profile. In some implementations, the party's settings may include configurable keywords or other data that specify which items they do not want the advertising component 130 to display, configurable keywords or other data that specify which items they want the advertising component 130 to display, minimum or maximum age thresholds for advertising, minimum or maximum gameplay hours for advertising, min/max number of items to advertise, radius of geo-fence (e.g., distance of an avatar from a digital advertisement element) to trigger the advertisement display, min/max number of users in the geo-fence to trigger the ad display, target demographics, and/or other advertising settings.

The advertising settings may also be controlled and/or overridden by more restrictive advertising campaign controls for a media item (such as a virtual experience, game, product, brand, multiple associated brands, movie, film, sports team match, or other media items). The media item may be produced by a separate party (from the advertiser) and may include any suitable media item that is subject of an advertising campaign.

The advertising component 130 may receive indication or detect that a user's avatar is participating in a first virtual experience 105 through the virtual experience application 112. The indication may include indication that the avatar associated with a first user identifier (ID) is within a threshold radius (or within a geo-fence) of digital advertising element 220 that is located within the first virtual experience 105.

In some implementations, in response to detecting that an avatar is within the threshold radius, the advertising component 130 may display a particular digital ad 212 at the digital advertising element 220. The displayed digital ad 212 may include a banner, image, or moving picture associated with the user preferences associated with the avatar. For example, age-specific restrictions may be applied in selecting and displaying the particular digital ad. Other restrictions may also be applicable, including geographic and/or locale-specific restrictions, time-specific restrictions, etc.

In some implementations, a developer can place the digital advertising element 220 anywhere within the first virtual experience 105. In some implementations, a developer may place any number (one, two, five, hundred, thousand, etc.) of digital advertising elements 220 within the first virtual experience 105. In some implementations, various settings and/or restrictions in advertising may override the developer's request to add more than a threshold number of digital advertising elements to any particular virtual experience.

By approaching, e.g., walking towards (or flying, driving, riding, sailing, or via any other movement) to be within the threshold distance of the digital advertising element 220, the user's avatar may be displayed the particular digital advertisement 212.

Upon interaction by the user's avatar with the digital advertisement 212, the user may select one or more items to interact with or purchase. If the avatar has selected (e.g., through selections 210) an item 208 to interact with or try on (e.g., if the item is a piece of clothing or accessories that can be worn by the avatar), the advertising component 130 may temporarily allow the avatar to appear as if the virtual item is worn. If the user issues a selection 210 to purchase the virtual item, the selection 210 is processed by the advertising component 130 to effectuate the purchase. Thereafter, the avatar may be granted use of the purchased virtual item and the item placed into an item inventory associated with the corresponding user on the virtual experience platform. Upon successful purchase (or based on a digital advertisement viewing criterion being met, e.g., to qualify as an impression), the advertising component 130 may also determine an associated monetization amount to be transferred to the associated developer account. The monetization amount may be in the form of virtual currency, in some implementations.

It is noted that advertisers may also receive revenue through use of advertisements as described herein. In some implementations, advertisers place a bid for a price (e.g., maximum price) they're willing to pay per unique player or avatar. In some implementations, advertisers may pay a cost per valid impression. In some implementations, advertisers may pay a cost per unique impression from individual avatars if the advertisement is viewed by more than one avatar.

A unique player is defined as a user that converts (e.g., takes a particular action such as purchase, try on, or otherwise interact with the virtual item or other item that is subject of the digital advertisement) for a particular advertisement for the first time. A unique impression is defined as a unique player interacting with the digital advertisement during the experience.

It is also noted that unique advertising views/impressions may be tracked using the example embodiments described herein. For example, advertising metrics 214 may include engagement metrics based on engagement with different digital advertising elements (e.g., such as billboards, doors, portals, etc.). The advertising component 130 or another component may track engagement metrics for digital advertisements.

Some examples of portal and advertising metrics include different metrics based on types of user views and/or impressions and/or engagement actions. A first metric may count a total number of unique users that joined a virtual experience. For example, if the number goes up for the virtual experience when more digital advertisements for the virtual experience are displayed by the platform, it may indicate a success rate of the advertisement. A different metric may count a total number of impressions for a particular digital advertisement. For example, if the number of impressions increases or decreases, this change may indicate a measure of success for the digital advertisement. Additionally, advertising metrics 214 may also include a total number of unique users in each group that joined the virtual experience in a given time period (e.g., one week) and viewed a digital advertisement. For example, advertising metrics 214 may also include the number of total impressions for the advertisement in each group within a time period (e.g., one week).

These and other advertising metrics may be used to calculate at least a portion of engagement metrics.

Engagement metrics may also be utilized to calculate other advertising metrics 214, for example, by: average playtime of users for each group, average monetization conversion percentage of users for each group, average revenue per user for each group, and other impacts.

Some examples of advertising impressions include: a percentage or amount of time spent viewing an advertisement. When considering digital advertising elements, impressions may be tracked by: determining an angle of incidence or angle of view based upon an avatar's perspective and distance from a digital advertising element, through analysis of an avatar's viewport or perspective, through analysis of an amount of time an avatar is within a threshold distance from a digital advertising element and within a threshold angle of view, and/or through analysis of a percentage of viewable surface of an advertisement displayed at the digital advertising element. In some implementations, the minimum time to count as an advertising impression is one second and the distance between an avatar and the digital advertisement element is close enough (e.g., within the threshold distance) for the avatar to view the digital advertisement and hear the associated audio being displayed at the digital advertising element. For example, an avatar may view a digital advertisement from an angle such that the ad is not visible clearly or is obstructed. This may count for a partial impression or may not count as an impression. For example, an avatar may view a digital advertisement through a viewport which may be analyzed for pixel count or percentage of an advertisement that is obfuscated or viewable. This may count for partial impression or may not count as an impression. For example, an avatar may view an advertisement for an amount of time. This may be used to determine time-based metrics.

As further illustrated, a second user's avatar may view a different digital advertisement at the same digital advertising element 220. For example, a view of the first user's advertisement may be hidden (e.g., by only serving/displaying the second ad to the second user) such that independent engagement metrics may be calculated.

In some implementations, the first digital advertisement is obfuscated for the second avatar and the second digital advertisement is obfuscated for the first avatar, and the first digital advertisement and the second digital advertisement are presented simultaneously. For example, if the advertisement include video or media content, the media content may be played back for a respective user while the user is actively viewing or engaged with the digital advertising element 220. Furthermore, upon looking away or moving away from the digital advertising element 220, a respective digital advertisement may be paused or ceased for the avatar moving away, while the other avatar may still view a respective digital advertisement. Other variations may also be applicable.

Hereinafter, several definitions and terms associated with advertising in a virtual experience are provided for clarity of discussion.

Definitions

Data Model—the asset hierarchy that makes up a virtual experience.
Model—a container asset that can consist of Parts, Scripts, and other instances
Instance—term used to describe an object and/or virtual object.
Advertisement GUI—a new instance created to display an advertisement.
Advertisement unit—the object containing the ad creative (i.e., billboard, portal, wall, etc.)

Hereinafter, various advertising formats for digital advertisements are described.

Interactive Advertising Formats

The online virtual experience platform may serve static ad creatives (e.g., billboards, portals, headers, and others). Billboard and similar static structures may be interactive and/or clickable by avatars, in some implementations. Developers may insert static advertising elements via a GUI. The static advertising elements will have the look and feel of a street billboard or wall, surface, etc. Developers may also use the actual creative image independent of the billboard object to overlay on top of any compatible object in an experience (e.g., side of a building, interior wall, etc.).

Some other advertising creatives may include, for example:

Billboards or structures that light up (or include other highlighting features) or spins (or other motion) when a player/avatar steps within range.

Clickable image ads that can generate a QR code.
Interactive advertising containers that react to player behavior (i.e., a player steps on a colored tile and the borders of the ad container change, or other behaviors)
Clickable ad units that can be used by the developer to incorporate into gameplay based on goals, waypoints, milestones, and other gameplay features.
Video ad units that play looped video, GIF, motion pictures, cartoons, and/or any other video displays that may also be interactive. Audio may be included as part of video playback. Audio may also be incorporated when an avatar is within proximity and/or implemented with spatial audio; a user may search out an interactive element based on spatial audio (e.g., and highlight and/or become active visually once a user is within proximity or has found the advertising creative).
Billboards and other ad creatives may be interactive when disposed in a virtual experience. For example, these and other advertising units can become interactive based on the following examples of user engagement:
Player/avatar travels within proximity of ad unit;
Player/avatar "views" the ad unit;
Player/avatar can click on the ad unit; and/or
Player's geographical position in real life may trigger the ad unit (e.g., with appropriate permissions obtained and other security controls implemented).

The above and other interactions can trigger the following example behaviors:

Sale of virtual items: the sales may be effectuated through a new advertising experience that an avatar is transported/teleported to due to interaction with the ad; the sales may be effectuated through a user interface for purchasing products (both virtual and real-world/physical items); the sales may be effectuated through a purchasing experience such as selecting different items in the interactive advertisement and virtually transporting them to a virtual cash register or virtual point of sale; and others.

Sale of real physical items: the sales of physical items may be effectuated through examples similar to those described herein-above with reference to virtual purchases; users may use a secure transaction processing platform or the virtual experience platform (with appropriate permissions and security implemented) to transfer funds for real-world items; and others.

Add events to a user's calendar or event scheduler: events interacted with and selected may be added automatically (or with a separate prompt/user selection) to a user's personal calendar or shared calendar or other calendar (with appropriate permission granted to the virtual experience platform); a user may also utilize a calendar service on the virtual experience platform which may automatically include this functionality; a user-selected event may also be emailed to an appropriate user email address such that a user may manually import the emailed event data to a calendar (through attachment of an electronic calendar entry file, event data, or other data); and others.

Add QR code or promo code to virtual wallet: Quick Response (QR) codes, promotion codes, promo codes, coupons, and others may be transmitted to a user's virtual wallet or a e-wallet application; codes may also be emailed to an appropriate user email address; and others The online virtual experience platform may also serve advertisements that are embossed or wrapped onto virtual items. For example, virtual items may be re-skinned to include an advertiser's logo, a sports' emblem, a logo, a manufacturer name, and other attributes. For example, virtual items may be re-skinned to include popular textures from famous paintings or other similar features. For example, virtual items may be re-painted to include features identifiable as being associated with a product, service, or advertiser. Other variations may also be applicable.

Interactive Advertising Moderation

Users may report offensive advertisements. Offensive content reporting links may be rendered for each digital advertising element for misleading, offensive, or objectionable content. Reporting link will provide a menu for reporting advertising that violate content policies. Reports can populate an automatic or administrative moderation queue specifically for advertisements. Advertising creatives that are submitted can be placed in an advertising specific moderation queue. Moderators may use a prioritization framework to ensure that turnaround time for advertisement review is within a particular time period (e.g., 1-2 hours of creative submission).

Viewable Advertising Impressions

Advertising impressions may be calculated on the server side or on the client side. There are at least two types of impressions, rendered impressions and viewable impressions. A rendered impression is generated whenever an in-experience advertisement is rendered on the client side, regardless of whether or not the user has an opportunity to see it. A viewable impression is generated whenever an in-experience advertisement is rendered on the client side and the user has an opportunity to see it.

A valid impression may be based upon the following: accumulated impression time must be 10 second or greater (only increments of at least 1.5 seconds can count toward the accumulated impression time); Advertisement occupies at least 1.5% of screen size; angle between advertisement and plane is at most 55 degrees; 50% of the advertisement must be on screen. Other variations on impressions may be applicable. Additionally, a user ID of a user viewing the advertisement, a timestamp, a container ID, and other data may also be recorded. Furthermore, lighting of the advertisement, motion of an avatar, motion of the advertisement, and other dynamic features may be used in calculating impressions.

In some implementations, ray-casting may be used to determine full or partial impressions. The ray may be cast from an avatar onto the advertisement, in some implementations. In some implementations, the ray may be cast from the advertisement onto the target avatar.

In some implementations, random ray-casting may be used to determine full or partial impressions and/or ad obstruction percentages. The random ray may be cast from an avatar or a viewport onto the advertisement. The random ray cast may be repeated for a window of time, such that a number of random rays are cast. The accumulation of non-obstructed random rays may be used to determine a percentage of obstruction.

In some implementations, at least five (5) rays may be cast (e.g., randomly towards the advertisement) from an avatar (or a viewport) onto a digital advertisement to determine whether the advertisement is obstructed.

In some implementations, non-human activity may be considered when calculating advertising impressions and valid impressions. In some implementations, gameplay hours, time within a virtual experience, time non-moving within a virtual experience, and other attributes may be used in determining valid impressions.

In some implementations, various viewable ad data including screenshots, viewports, perspectives, and other data may be captured for auditing of ad impressions and revenue. For example, viewports from a user's view may be used to verify and/or audit ad impressions. For example, screenshots from a user's perspective may be used to verify and/or audit ad impressions. Other data may also be captured from a user perspective, or from an interactive advertisement's perspective, to verify and/or audit ad impressions.

In some implementations, a mask of non-advertised matter may be laid over a user's viewport to determine which portions or percentages of the viewport contain ads. The same or similar may be leveraged to determine an ad impression. In some implementations, all advertised matter may be masked to determine if a user's view includes too many ads or to determine invalid ad views. Other implementations may also be applicable.

Further or different advertising impression calculations may be based on international advertising standards, local advertising standards, and other specifications. Interactive Advertising Bureau (IAB) guidelines may be applicable in some implementations. IAB standards defines the following criteria for in-game display impression:

Size requirements (pixel requirements): advertisement should occupy at least 1.5% of screen size; angle between advertisement and plane is at most 55 degrees; and 50% of the advertisement must be visible to the avatar, etc. The percentages and numbers listed are illustrative, and any suitable numbers may be used in various implementations.

Time requirements: The time requirement is met if time viewing an advertisement is greater than or equal to one continuous second, post advertisement render.

It is noted that "continuous second" denotes materially continuous, and it does not require the pixel requirements to be met for every frame. For example, a fast moving user could lead to certain snapshots in the second returning "non-viewable" state, while the opportunity to see the advertising creative is materially continuous. Therefore, JAB allows a majority approach used, with empirical validation.

For a polling-based approach, IAB requires a polling frequency of 200 ms. Less frequent polling is allowed with empirical validation that it does not lead to material differences in viewability counting.

Both pixel requirements and time requirements have some ambiguity that are not clearly defined by the standards: lighting, opacity, contrast with background or other objects, shading and moving particles could all impair the visibility. JAB does not recommend any threshold for these. JAB does not define what is "materially continuous", it only has a basic description as "the opportunity to see a creative".

In some implementations, the polling or sampling base approach may be used. State-change-based approach may also be used, but may be computationally complicated in a highly dynamic virtual environment. The sampling can include calculating whether an advertisement meets pixel requirements for a frame and can be done in a "real time" manner.

Different sampling approaches can include ray-casting, bounded box tests, and/or rendering pixel tests.

Creating Interactive Digital Advertisements

Developers may create an advertising set and an advertising campaign. Developers may utilize advertising insertion tools from the platform 100 and the advertising component 130 to: Click on advertisements from a drop down menu, view/engage with a gallery of advertising objects; select an object from the gallery drag it into an experience; object can be dragged anywhere in an experience; resizing objects; maintaining aspect ratios; ensuring minimum size; and other functions.

Defining an Advertisement Set

Advertisement sets are used to define an audience of users that an advertiser is targeting. The selection of country, gender, age, and/or demographic targeting may automatically update preferences for a particular digital advertisement being created. Thereafter, several different advertisements, each targeting a particular demographic (or other user attribute) may be defined. Furthermore, in addition to targeting based on user attributes, device attributes (e.g., speed, capacity, battery life, manufacturer, etc.) may be used for targeting advertisements.

Minimum Distance Between Interactive Digital Advertisements

To avoid overly monetized experiences, there may be enforced a minimum distance between advertisement elements placed in an experience. For example, a minimum distance of 100 meters (roughly the length of a football field) between advertisements may be a default minimum distance in some implementations.

Hereinafter, example visualizations and configurations of the digital advertising element 220 is described in detail below with reference to FIG. 3.

Figure 3:
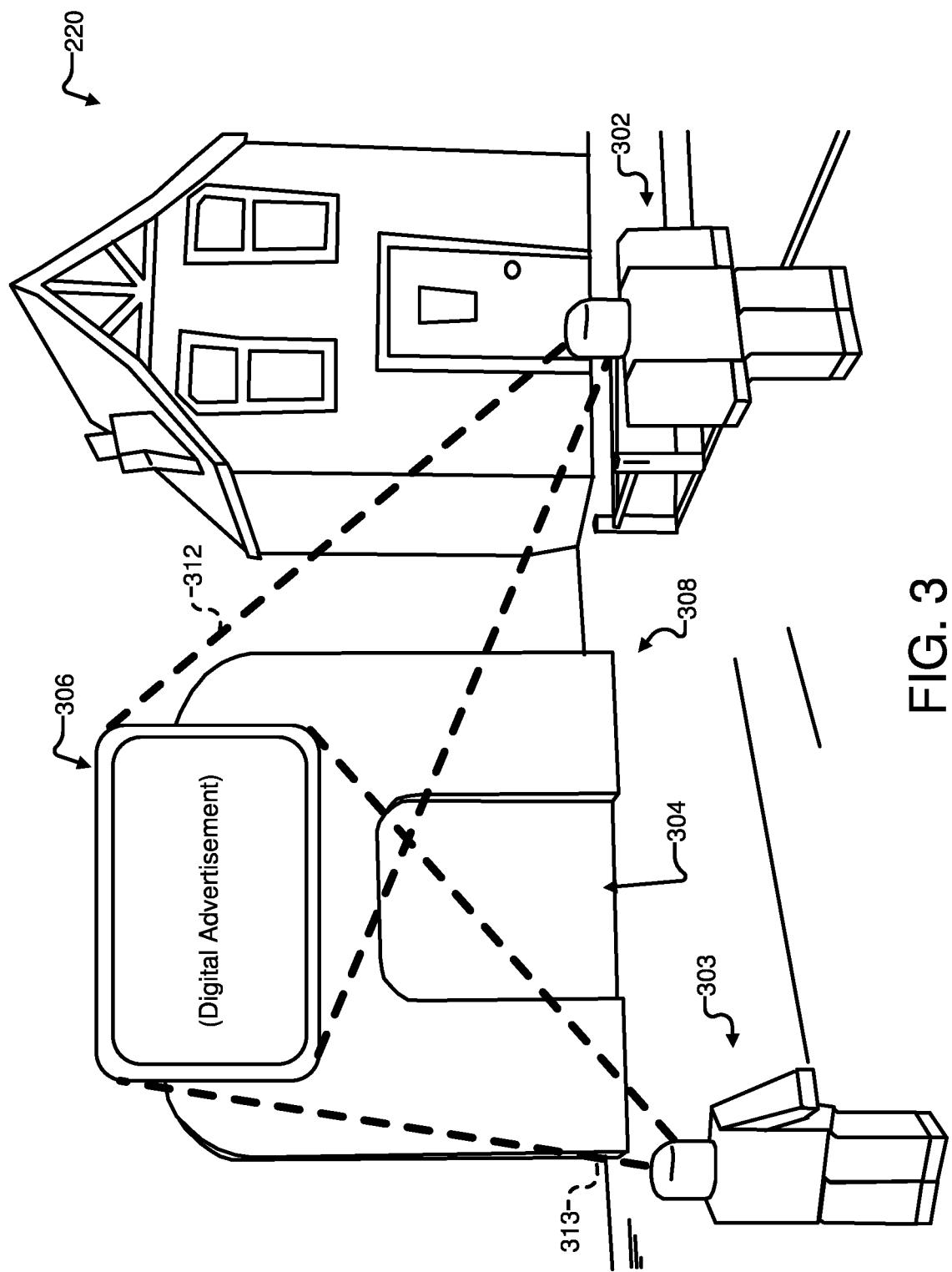
FIG. 3 is a perspective view of a digital advertising element, in accordance with some implementations.

FIG. 3: Digital Advertising Element

FIG. 3 is a perspective view of a digital advertising element 220 in a virtual experience, in accordance with some implementations. It is noted that the description provided in reference to FIG. 3 is illustrative only, and not limiting. For example, actual appearance of a digital advertising element may be varied in many ways. Furthermore, the number, types, and displayed media may be altered in many ways. Moreover, the simplified schematic shown is for illustrative purposes only, and does not encompass all variations which may be applicable to example embodiments.

As shown in FIG. 3, the digital advertising element 220 may comprise a display member 306 configured to display first media (or advertising indicia) associated with the at least one media item. In some implementations, the display member 306 may be a standalone member that can be displayed at suitable locations, e.g., on a wall, on a billboard, on a surface, etc. within the virtual experience. In some implementations, the digital advertising element 220 may also include a portal member 304 proximate the display member 306. The portal member may be an optional member that allows an avatar to be transported to a different virtual experience and/or advertising experience. Other display members 308 (such as lintels or doorway surrounds) may also be arranged proximate the portal member 304. The displayed first media may be displayed as a static or moving image, in some implementations.

In some implementations, the displayed example element 306 may not include the portal member 304, be arranged on a different virtual item or element, and/or float above ground level of the virtual experience. Other variations may also be applicable. For example, digital advertising elements may be arranged on flat surfaces, curved surface, virtual items, virtual objects, doors, walls, roofs, clothing, and others.

In example embodiments, the digital advertising element 220 may be placed anywhere within a virtual experience. The placement and number of digital advertising elements may be selected based upon developer settings, advertiser settings, user settings, and other suitable parameters, including parameters specified by the virtual experience platform operator and/or a director of a media campaign.

In some implementations, a developer can place the digital advertising element 220 anywhere within the first virtual experience. In some implementations, a developer may place a number of virtual user engagement elements 220 within the first virtual experience. In some implementations, various settings and/or restrictions in advertising may override the developer's request to add more than a threshold number of virtual user engagement stations to any particular virtual experience.

In some implementations, an advertiser or a virtual experience platform operator may place constraints on an appearance of the element 220 to ensure consistency with any advertising preferences. In some implementations, an advertiser or a virtual experience platform operator may place constraints on an appearance of the element 220 to ensure consistency with virtual experience platform rules. In some implementations, an advertiser or a virtual experience platform operator may place constraints on an appearance of the element 220 to ensure consistency or uniformity in all elements. In some implementations, an advertiser or a virtual experience platform operator may place constraints on an appearance of the element 220 such that the elements 220 appear natural within the first virtual experience (e.g., at least partially matching a design aesthetic, background appearance, and/or theme of the first virtual experience).

As further illustrated, as a user's avatar 302 approaches the digital advertising element 220, the display member 306 may display first media, and the element member 304 may glow or emanate visual cues (and/or play audio cues) to denote an active element. As the avatar 302 engages with the displayed digital advertisement, engagement metrics may be tracked and/or applied to a particular digital advertisement. For example, the avatar's perspective is denoted by element 312 which shows example ray casts.

Furthermore, a second avatar 303 may also view the digital advertising element and/or display member 306 (e.g., see ray casts 313 associated with the second avatar 303). In this example, both the first avatar 302 and the second avatar 303 view a different digital advertisement. The same may be varied depending upon user attributes for both avatars such that under some circumstances they are severed the same or a similar advertisement.

Figure 4:
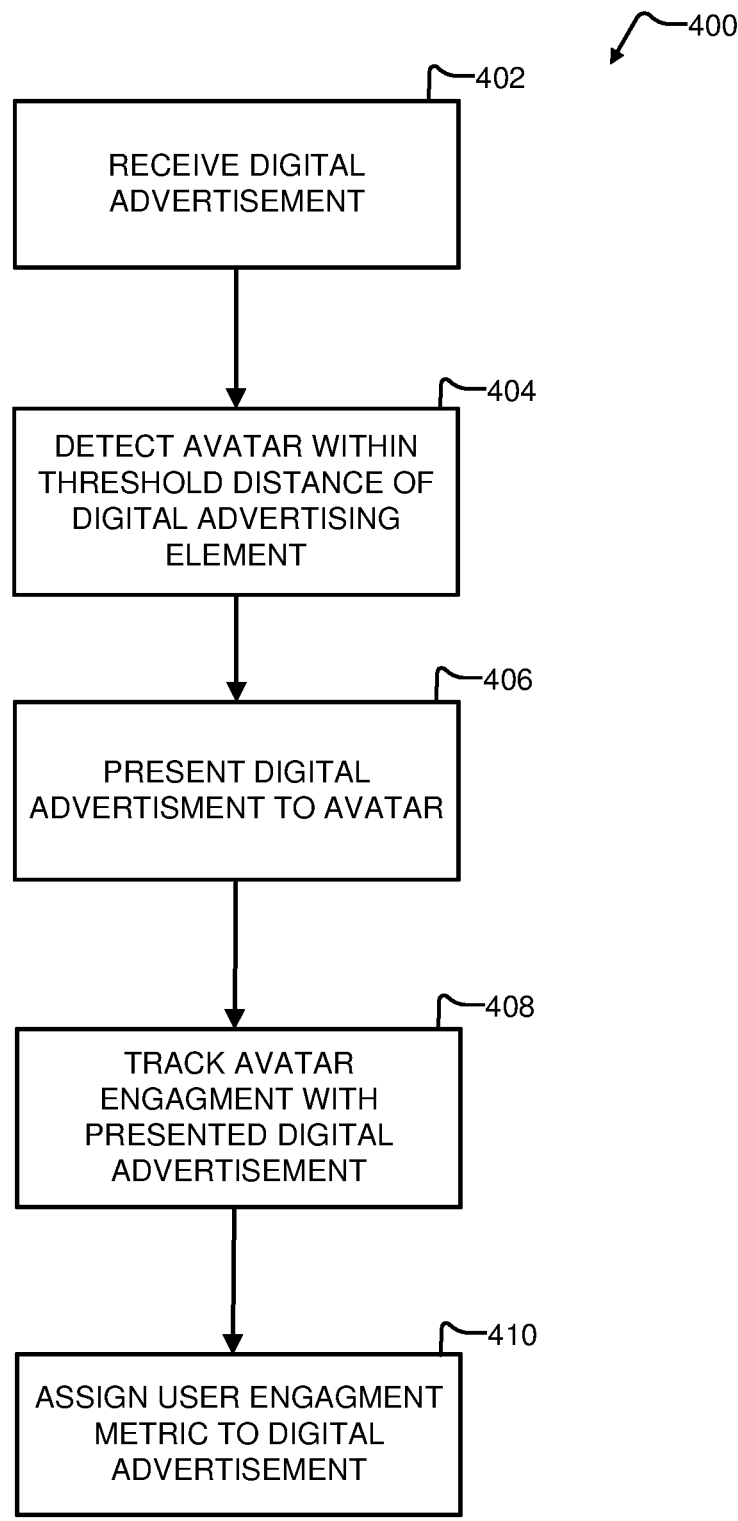
FIG. 4 is a flowchart of an example method of interactive digital advertising, in accordance with some implementations.

FIG. 4: Method of Interactive Digital Advertising for an Avatar

FIG. 4 is a flowchart of an example method of implementing interactive user engagement portals, in accordance with some implementations.

In some implementations, method 400 can be implemented, for example, on a server 102 described with reference to FIG. 1 and FIG. 2. In some implementations, some or all of the method 500 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., a time since last advertisement exceeding a threshold, a number of transports exceeding a threshold, a predetermined time period having expired since the last performance of method 400 for a particular medial item or user, and/or one or more other conditions occurring which can be specified in settings read by the method.

Method 400 may begin at block 402. At block 402, a digital advertisement is received at an advertising component. The digital advertisement may be configured for viewing by a target demographic. In some implementations, the digital advertisement includes digital video, audio, animated loops, or other dynamic elements.

In some implementations, the digital advertisement element is a virtual element that is generally invisible if no advertisement is displayed. In some implementations, the digital advertising element may display a default image, default video, or default static indicia, e.g., in the absence of a digital advertisement that matches an avatar that is within a threshold distance from the digital advertisement element, in the absence of an advertiser bid for the digital advertisement element, when advertising is turned off (e.g., by a developer of the virtual experience, for a particular user such as a premium customer, etc.), etc.

In some implementations, the digital advertisement element is associated with an interactive engagement portal configured to transport a user's avatar to a new virtual experience associated with the displayed digital advertisement. In some implementations the digital advertisement element is associated with a particular virtual item and is configured to display a digital advertisement based upon avatar interactions with the virtual item.

In some implementations, the digital advertisement element may be one or more of: a virtual billboard, a virtual display device, a virtual wall, or a virtual element having at least one surface. Other variations may also be applicable. Block 402 may be followed by block 404.

At block 404, an avatar is detected within a threshold distance of the digital advertisement element. For example, the threshold distance of the digital advertisement element is a configurable distance based upon a total number of pixels of the digital advertisement. In some implementations, detecting the avatar within the threshold distance includes determining that the avatar is within the threshold distance associated with the digital advertisement. For example, the digital advertisement may include advertising preferences as described above, and the preferences may include a minimum activation distance or another threshold. Other variations may also be applicable. Block 404 may be followed by block 406.

At block 406, the received digital advertisement is presented and/or displayed at the digital advertisement element. For example, image advertisements may be displayed as static images, audio advertisements may be played audibly for a target avatar, video advertisements may be played back for avatar viewing, and others. In some implementations, the presenting may include initiating playback of a digital video, digital audio, and/or digital loop of animation, associated with the digital advertisement for viewing by the avatar. Block 406 may be followed by block 408.

At block 408, the avatar's engagement with the presented digital advertisement is tracked by the advertising component or another component of the platform 100. The engagement is based upon one or more of: tracking head movements and viewports associated with the avatar, viewpoint, perspective, time spent viewing, size of view, obfuscation of view, or distance from advertisement. Other engagement metrics may also be applicable.

In some implementations, avatar movements are tracked to determine the avatar's engagement. In some implementations, the tracking may include determining a percentage of pixels associated with the digital advertisement that are viewable by the avatar. In some implementations, the digital advertisement is paused or "turned off" if an avatar looks away, then resumes automatically once the avatar views the digital advertisement element again. Other variations may also be applicable.

The advertising component 130 may record and/or store these and other interactions for determining user engagement metrics, advertising impressions, and other advertising metrics. The metrics may be recorded and user input may be received (if an avatar directly clicks, for example). Block 408 may be followed by block 410.

At block 410, user engagement metrics for the displayed advertisement based upon tracking of the avatar's engagement are assigned to the displayed digital advertisement. For example, the advertising component may store engagement metrics associated with different advertisements for use in determining valid impressions as described in detail above with reference to FIG. 2. The engagement metrics may inform future advertising preferences, target audiences, target demographics, target devices (e.g., if an advertisement was too slow for some devices, or too rapid for modern devices, etc.), and others.

Blocks 402-410 can be performed (or repeated) in a different order than described above and/or one or more blocks can be omitted. For example, blocks 404-410 may be performed repeatedly as avatars engage with the digital advertising element. Block 402 may be repeated for several different digital advertising elements to be placed within the virtual experience. Method 400 can be performed on a server (e.g., 102) and/or a client device (e.g., 110). Furthermore, portions of the method 400 may be combined and performed in sequence or in parallel, according to any desired implementation.

Hereinafter, methods of interactive digital advertising based at least in part on virtual user engagement portals are described with reference to FIG. 5.

Figure 5:
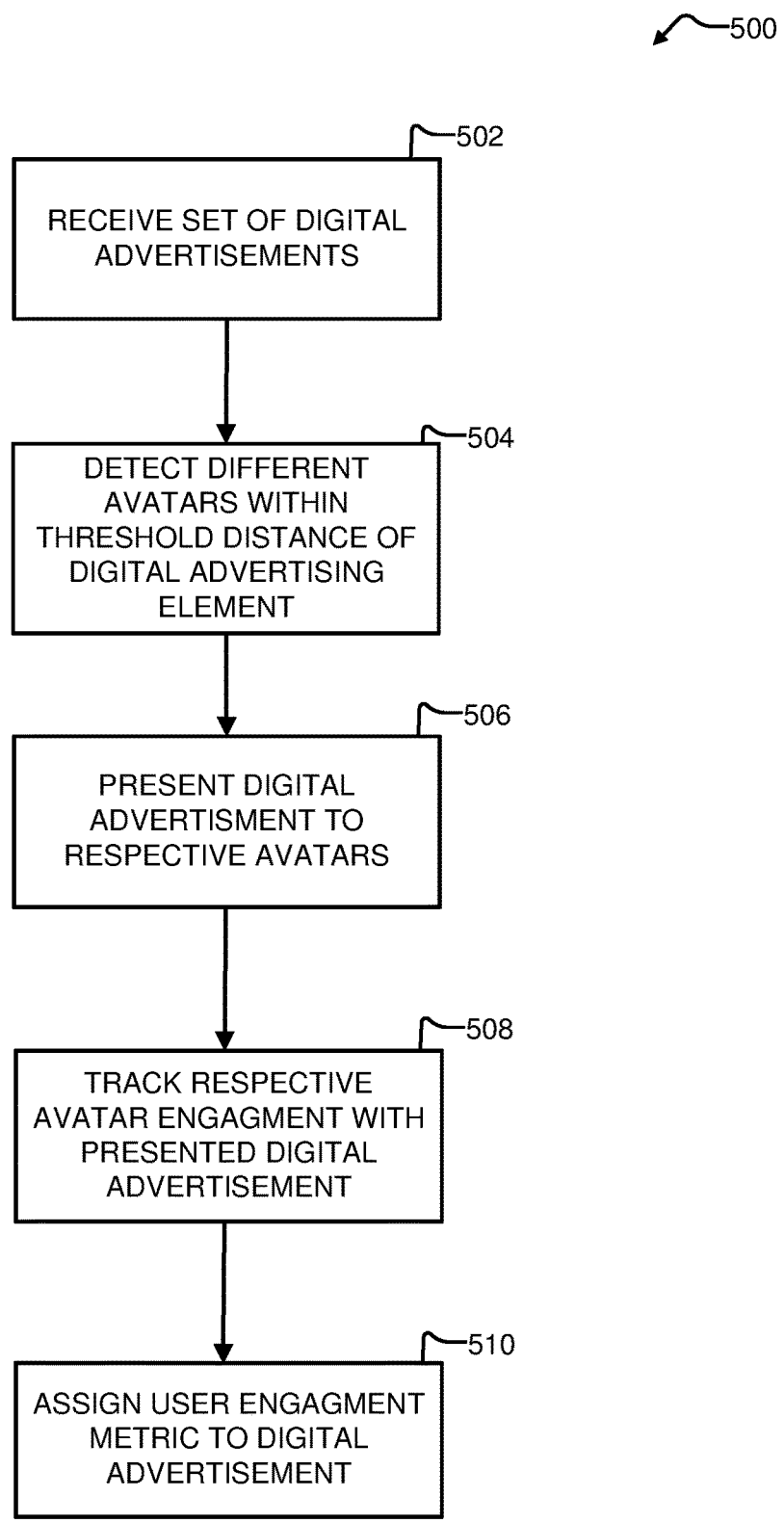
FIG. 5 is a flowchart of an example method of interactive digital advertising, in accordance with some implementations.

FIG. 5: Method of Interactive Digital Advertising for Two or More Avatars

FIG. 5 is a flowchart of an example method of interactive digital advertising, in accordance with some implementations.

In some implementations, method 500 can be implemented, for example, on a server 102 described with reference to FIG. 1 and FIG. 2. In some implementations, some or all of the method 500 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 500. In some examples, a first device is described as performing blocks of method 500. Some implementations can have one or more blocks of method 600 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., a time since last advertisement exceeding a threshold, a number of transports exceeding a threshold, a predetermined time period having expired since the last performance of method 500 for a particular medial item or user, and/or one or more other conditions occurring which can be specified in settings read by the method.

Method 500 may begin at block 502. At block 502, a set of digital advertisements may be received at an advertising component. For example, the set of digital advertisements may include two or more digital advertisements, and each of the set of digital advertisements being configured for viewing by a different user demographic. In this manner, different advertisements from the set of received advertisements may be displayed or presented to different users within the same virtual experience. Block 502 may be followed by block 504.

At block 504, a first avatar and second avatar are detected within a threshold distance of a digital advertisement element presented in a virtual experience. For example, the first avatar may be associated with a first user and the second avatar may be associated with a second user. In these examples, and for clarity, the first user and the second user are associated with a different target demographic, audience, or device type. Other targeting attributes may also be applicable.

In some implementations, the threshold distance of the digital advertisement element is a configurable distance based upon a total number of pixels of a respective digital advertisement of the received set of digital advertisements. For example, advertisements of different sizes or having different content may have different threshold requirements. Accordingly, in some implementations, both the first and second avatar must be within a respective threshold distance for any advertisements to be presented. In this manner, neither avatar may be presented an advertisement if both avatars are not within the respective threshold distance of their respective advertisements. Other variations may also be applicable, including variations where an average threshold distance is used, where minimum or varying thresholds are used for sets of advertisements, or where otherwise thresholds are more closely related so as to limit lack of advertising when one avatar is not within a threshold distance for a particular advertisement.

In some implementations, the digital advertising element is arranged similarly to those described in detail above. Furthermore, in some implementations, the digital advertising element can be one or more of: a virtual billboard, a virtual display device, a virtual wall, or a virtual element having at least one surface. Other variations on element style, placement, and type may also be applicable. Block 504 may be followed by block 506.

At block 506, a first digital advertisement of the received set of digital advertisements is presented at the digital advertisement element for viewing by the first avatar, and a second digital advertisement of the received set of digital advertisements is presented at the digital advertisement element for viewing by the second avatar. The second avatar does not view the first digital advertisement and the first avatar does not view the second digital advertisement. For example, other digital advertisements can be displayed simultaneously, while only being actually rendered for view by the targeted avatar. In this manner, avatars can co-experience engagement within a virtual experience while viewing different advertisements simultaneously. Other variations may also be applicable. Block 506 may be followed by block 508.

At block 508, the first avatar's engagement with the first digital advertisement is tracked. Additionally, the second avatar's engagement with the second digital advertisement is also tracked at block 508. In this manner, separate user engagement metrics for different avatars and different advertisements may be tracked simultaneously.

The tracking may be similar to the tracking described with reference to FIG. 4. Additionally, in some implementations, the tracking may include tracking head movements and viewports associated with the first avatar and second avatar to determine whether a respective digital advertisement is being viewed.

In some implementations, for example if video, audio, and/or media content is played as part of a digital advertisement, tracking can also include pausing, in response to the first avatar looking away from the first digital advertisement, digital video of the first digital advertisement and resuming playback, in response to the first avatar viewing the first digital advertisement after looking away from the first digital advertisement, the digital video of the first digital advertisement. The same may be varied to handle digital video, audio, and/or media content for the second avatar.

Block 508 may be followed by block 510.

At block 510, user engagement metrics for the displayed advertisement based upon tracking of the respective (first or second) avatar's engagement are assigned to the displayed digital advertisement. For example, the advertising component may store engagement metrics associated with different advertisements for use in determining valid impressions as described in detail above with reference to FIG. 2. The engagement metrics may inform future advertising preferences, target audiences, target demographics, target devices (e.g., if an advertisement was too slow for some devices, or too rapid for modern devices, etc.), and others.

Blocks 502-510 can be performed (or repeated) in a different order than described above and/or one or more blocks can be omitted. For example, blocks 504-510 may be performed repeatedly as different avatars engage with the digital advertising element. Block 502 may be repeated for several different digital advertising elements to be placed within the virtual experience. Method 500 can be performed on a server (e.g., 102) and/or a client device (e.g., 110). Furthermore, portions of the method 500 may be combined and performed in sequence or in parallel, according to any desired implementation.

Hereinafter, a more detailed description of various computing devices that may be used to implement different devices and/or components illustrated in FIGS. 1-2 is provided with reference to FIG. 6.

Figure 6:
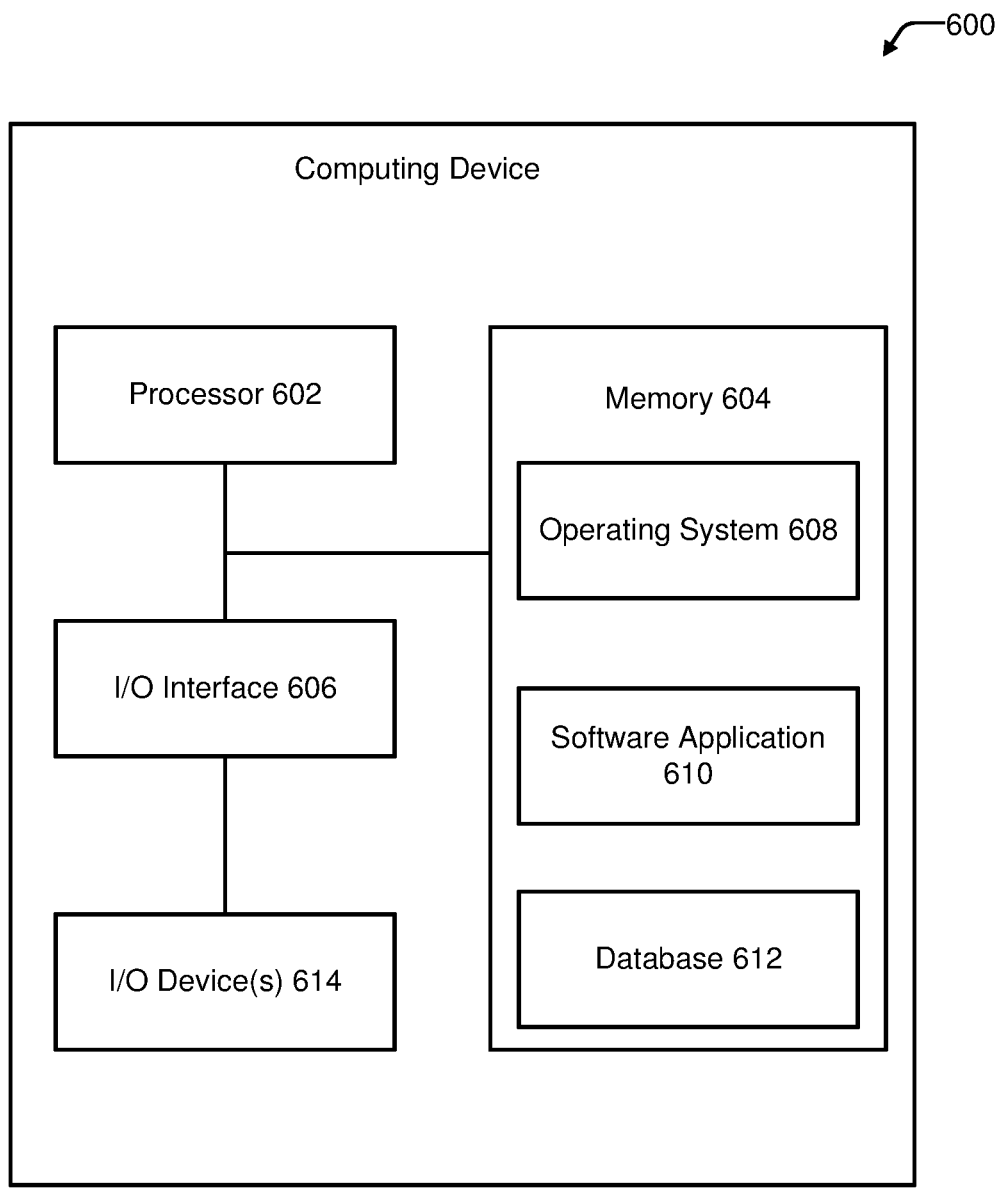
FIG. 6 is a block diagram illustrating an example computing device, in accordance with some implementations.

FIG. 6: Computing Devices

FIG. 6 is a block diagram of an example computing device 600 which may be used to implement one or more features described herein, in accordance with some implementations. In one example, device 600 may be used to implement a computer device, (e.g., 102, 110 of FIG. 1 and FIG. 2), and perform appropriate operations as described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, headphones, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, software application 610 and associated data 612. In some implementations, the applications 610 can include instructions that enable processor 602 to perform the functions described herein, e.g., some or all of the methods of FIG. 4 and FIG. 5. Software application 610 may include some or all of the functionality required to present interactive digital advertisements. In some implementations, one or more portions of software application 610 may be implemented in dedicated hardware such as an application-specific integrated circuit (ASIC), a programmable logic device (PLD), a field-programmable gate array (FPGA), a machine learning processor, etc. In some implementations, one or more portions of software application 610 may be implemented in general purpose processors, such as a central processing unit (CPU) or a graphics processing unit (GPU). In various implementations, suitable combinations of dedicated and/or general purpose processing hardware may be used to implement software application 610.

For example, software application 610 stored in memory 604 can include instructions for retrieving user data, for displaying/presenting interactive digital advertisements, and/or other functionality or software such as the advertising component 130, VE Engine 104, and/or VE Application 112. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 400 and/or method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

In situations in which certain implementations discussed herein may obtain or use user data (e.g., user demographics, user behavioral data, user contextual data, user settings for advertising, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of digital advertising within a virtual experience provided at a virtual experience platform, the method comprising:

receiving a plurality of digital advertisements, each advertisement configured for viewing by users of a respective target demographic;

detecting a first avatar and a second avatar that are each within a threshold distance of a digital advertisement element presented in the virtual experience, the first avatar being associated with a first user that is associated with a first target demographic, the second avatar being associated with a second user that is associated with a second target demographic different from the first target demographic, and wherein the threshold distance is a configurable distance based upon a total number of pixels of a first digital advertisement associated with the first target demographic, a second digital advertisement associated with the second target demographic, or a combination thereof;

simultaneously presenting the first digital advertisement associated with the first target demographic at the digital advertisement element for viewing by the first avatar and the second digital advertisement associated with the second target demographic at the digital advertisement element for viewing by the second avatar;

presenting audio associated with the first digital advertisement or the second digital advertisement based at least in part on a proximity of the respective avatar to the digital advertisement element, wherein the audio is implemented with spatial audio;

tracking engagement of the first avatar with the first digital advertisement and of the second avatar with the second digital advertisement, wherein the engagement is a measure of the respective avatar's interaction with the respective digital advertisement, wherein the tracking comprises:

casting a plurality of random rays from the respective avatar onto the digital advertisement element over a window of time; and determining a percentage of obstruction based on accumulation of non-obstructed random rays; and assigning a respective user engagement metric to the first digital advertisement and the second digital advertisement based upon the tracking of the respective engagement.

2. The computer-implemented method of claim 1, wherein the first digital advertisement and the second digital advertisement comprise digital video, and wherein tracking the engagement of the first avatar and of the second avatar comprises further tracking active viewing of the digital video by the first avatar and the second avatar.

3. The computer-implemented method of claim 1, wherein the digital advertisement element is one or more of: a virtual billboard, a virtual display device, a virtual wall, or a virtual element having at least one surface.

4. The computer-implemented method of claim 1, wherein presenting the first digital advertisement and the second digital advertisement comprises:
  initiating playback of a first digital video associated with the first digital advertisement and a second digital video associated with the second digital advertisement.

5. The computer-implemented method of claim 1, wherein tracking the engagement of the first avatar comprises tracking head movements and viewports associated with the first avatar to determine whether the first digital advertisement is being viewed.

6. The computer-implemented method of claim 1, wherein the engagement of the first avatar and the engagement of the second avatar are based upon one or more of: viewpoint, perspective, time spent viewing, size of view, obfuscation of view, or distance from the digital advertisement element.

7. The computer-implemented method of claim 1, further comprising ceasing presenting the first digital advertisement in response to the first avatar turning away from the digital advertisement element.

8. The computer-implemented method of claim 1, wherein the first digital advertisement is obfuscated or hidden from view of the second avatar.

9. A non-transitory computer-readable medium with instructions stored thereon that, responsive to execution by a processing device, causes the processing device to perform operations comprising:
  receiving a plurality of digital advertisements, each advertisement configured for viewing by users of a respective target demographic within a virtual experience;
  detecting a first avatar and a second avatar that are each within a threshold distance of a digital advertisement element presented in the virtual experience, the first avatar being associated with a first user that is associated with a first target demographic, the second avatar being associated with a second user that is associated with a second target demographic different from the first target demographic, and wherein the threshold distance is a configurable distance based upon a total number of pixels of a first digital advertisement associated with the first target demographic, a second digital advertisement associated with the second target demographic, or a combination thereof;
  simultaneously presenting the first digital advertisement associated with the first target demographic at the digital advertisement element for viewing by the first avatar and the second digital advertisement associated with the second target demographic at the digital advertisement element for viewing by the second avatar;
  presenting audio associated with the first digital advertisement or the second digital advertisement based at least in part on a proximity of the respective avatar to the digital advertisement element, wherein the audio is implemented with spatial audio;
  tracking engagement of the first avatar with the first digital advertisement and of the second avatar with the second digital advertisement, wherein the engagement is a measure of the respective avatar's interaction with the respective digital advertisement, wherein the tracking comprises:
    casting a plurality of random rays from the respective avatar onto the digital advertisement element over a window of time; and
    determining a percentage of obstruction based on accumulation of non-obstructed random rays; and
  assigning a respective user engagement metric to the first digital advertisement and the second digital advertisement based upon the tracking of the respective engagement.

10. The non-transitory computer-readable medium of claim 9, wherein the first digital advertisement and the second digital advertisement comprise digital video, and wherein tracking the engagement of the first avatar and of the second avatar further comprises tracking active viewing of the digital video by the first avatar and the second avatar.

11. The non-transitory computer-readable medium of claim 9, wherein the digital advertisement element is one or more of: a virtual billboard, a virtual display device, a virtual wall, or a virtual element having at least one surface.

12. The non-transitory computer-readable medium of claim 9, wherein presenting the first digital advertisement and the second digital advertisement comprises:
  initiating playback of a first digital video associated with the first digital advertisement and a second digital video associated with the second digital advertisement.

13. The non-transitory computer-readable medium of claim 9, wherein tracking the engagement of the first avatar comprises tracking head movements and viewports associated with the first avatar to determine whether the first digital advertisement is being viewed.

14. The non-transitory computer-readable medium of claim 9, wherein the engagement of the first avatar and the engagement of the second avatar are based upon one or more of: viewpoint, perspective, time spent viewing, size of view, obfuscation of view, or distance from the digital advertising element.

15. The non-transitory computer-readable medium of claim 9, wherein the operations further comprise ceasing presenting the first digital advertisement in response to the first avatar turning away from the digital advertisement element.

16. A system, comprising:
  a memory with instructions stored thereon; and a processing device, coupled to the memory and operable to access the memory, wherein the instructions when executed by the processing device, cause the processing device to perform operations including:
  receiving a plurality of digital advertisements, each advertisement configured for viewing by users of a respective target demographic within a virtual experience;
  detecting a first avatar and a second avatar that are each within a threshold distance of a digital advertisement element presented in the virtual experience, the first avatar being associated with a first user that is associated with a first target demographic, the second avatar being associated with a second user that is associated with a second target demographic different from the first target demographic, and wherein the threshold distance is a configurable distance based upon a total number of pixels of a first digital advertisement associated with the first target demographic, a second digital advertisement associated with the second target demographic, or a combination thereof;

simultaneously presenting the first digital advertisement associated with the first target demographic at the digital advertisement element for viewing by the first avatar and the second digital advertisement associated with the second target demographic at the digital advertisement element for viewing by the second avatar;

presenting audio associated with the first digital advertisement or the second digital advertisement based at least in part on a proximity of the respective avatar to the digital advertisement element, wherein the audio is implemented with spatial audio;

tracking engagement of the first avatar with the first digital advertisement and of the second avatar with the second digital advertisement, wherein the engagement is a measure of the respective avatar's interaction with the respective digital advertisement, wherein the tracking comprises:
  casting a plurality of random rays from the respective avatar onto the digital advertisement element over a window of time; and
  determining a percentage of obstruction based on accumulation of non-obstructed random rays; and assigning a respective user engagement metric to the first digital advertisement and the second digital advertisement based upon the tracking of the respective engagement.

\* \* \* \* \*